(12) United States Patent
Tokumura et al.

(10) Patent No.: US 7,404,462 B2
(45) Date of Patent: Jul. 29, 2008

(54) FUEL CELL ELECTRIC VEHICLE

(75) Inventors: Daisuke Tokumura, Saitama (JP); Yoshiyuki Horii, Saitama (JP); Junya Watanabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 534 days.

(21) Appl. No.: 11/199,156

(22) Filed: Aug. 9, 2005

(65) Prior Publication Data
US 2006/0040145 A1 Feb. 23, 2006

(30) Foreign Application Priority Data
Aug. 20, 2004 (JP) ............................. 2004-240700

(51) Int. Cl.
*B60K 15/063* (2006.01)
(52) U.S. Cl. ..................... 180/65.3; 180/65.2; 903/904; 903/908
(58) Field of Classification Search ............... 180/65.2, 180/65.3, 65.1, 68.5, 291, 220, 219, 65.6, 180/65.7; 903/904, 908
See application file for complete search history.

(56) References Cited

U.S. PATENT DOCUMENTS

| | | | |
|---|---|---|---|
| 5,193,635 A | | 3/1993 | Mizuno et al. |
| 5,658,013 A | * | 8/1997 | Bees et al. .................. 280/831 |
| 6,257,360 B1 | * | 7/2001 | Wozniak et al. ............. 180/69.5 |
| 6,378,637 B1 | | 4/2002 | Ono et al. |
| 6,568,496 B1 | * | 5/2003 | Huang .......................... 180/220 |
| 7,234,551 B2 | * | 6/2007 | Horii .......................... 180/65.1 |
| 2002/0066606 A1 | | 6/2002 | Nakamori |
| 2003/0186741 A1 | * | 10/2003 | Hayashida et al. ............ 463/31 |
| 2004/0050606 A1 | | 3/2004 | Yang et al. |
| 2004/0060750 A1 | | 4/2004 | Chernoff et al. |
| 2004/0140140 A1 | * | 7/2004 | Guay et al. .................. 180/210 |

FOREIGN PATENT DOCUMENTS

EP 1 398 263 A1 3/2004
JP 2001-130468 A 5/2001

* cited by examiner

*Primary Examiner*—Christopher Ellis
*Assistant Examiner*—John D Walters
(74) *Attorney, Agent, or Firm*—Birch, Stewart, Kolasch & Birch, LLP

(57) ABSTRACT

A fuel cell electric vehicle that can secure a sufficient stroke of a rocked driving wheel, lowering the center of the gravity of the vehicle. A fuel cell is provided for generating electric power by reacting hydrogen and oxygen with a hydrogen cylinder for supplying gaseous hydrogen to the fuel cell and a motor for generating motive power supplied to a rear wheel which is a driving wheel based upon electric power generated by the fuel cell. The hydrogen cylinder is arranged above the rear wheel so that its longitudinal direction is along a longitudinal direction of the vehicle with an axis in the longitudinal direction of the hydrogen cylinder being located off a center line in a direction of the width of the rear wheel.

20 Claims, 11 Drawing Sheets

FUEL CELL ELECTRIC VEHICLE

CROSS-REFERENCE TO RELATED APPLICATIONS

The present non-provisional application claims priority under 35 USC 119 to Japanese Patent Application No. 2004-240700 filed on Aug. 20, 2004 the entire contents thereof is hereby incorporated by reference.

BACKGROUND OF THE INVENTION

1. Field of the Invention

The present invention relates to the arrangement of a hydrogen cylinder in a fuel cell electric vehicle.

2. Description of Background Art

Heretofore, a fuel cell electric vehicle is known for driving a motor for propelling the vehicle based upon electric power supplied from a fuel cell wherein a hydrogen cylinder is arranged above a driving wheel so that the longitudinal direction is along a longitudinal direction of the vehicle. See, for example, JP-A No. 130468/2001.

In the above-mentioned conventional type construction, the clearance between a driving wheel and a hydrogen cylinder must be considered to secure a sufficient stroke when the driving wheel is vertically rocked. However, when the hydrogen cylinder is merely shifted higher than the driving wheel, the relatively heavy hydrogen cylinder is arranged higher and it is difficult to lower the center of the gravity of the vehicle.

SUMMARY AND OBJECTS OF THE INVENTION

An embodiment of the present invention provides a fuel cell electric vehicle wherein a sufficient stroke of a rocked driving wheel can be secured for lowering the center of the gravity of the vehicle.

An embodiment of the present invention includes a fuel cell electric vehicle which is provided with a fuel cell 51 for generating electric power by reacting hydrogen and oxygen. A hydrogen cylinder 52 is provided for supplying gaseous hydrogen to the fuel cell. A motor 31 is provided for generating motive power supplied to a driving wheel, for example, a rear wheel 32 based upon the electric power generated by the fuel cell and in which the hydrogen cylinder is arranged above the driving wheel so that the longitudinal direction is along a longitudinal direction of the vehicle. A center line is provided along the longitudinal direction of the hydrogen cylinder that is located off a center line in a direction of the width of the driving wheel.

According to this configuration, the clearance between the hydrogen cylinder and the driving wheel can be secured without merely vertically shifting the hydrogen cylinder.

In an embodiment of the present invention, a fuel cell electric vehicle is configured as a motorcycle for example in which the driving wheel is attached to a rear frame, for example, a motor unit 20, supported so that the rear frame can be rocked by a body frame 4, wherein a sufficient stroke of the rocked driving wheel can be secured, lowering the center of the gravity of the vehicle.

In case wherein the fuel cell electric vehicle is configured as a saddle-ride type vehicle such as a motorcycle, the width of the body in the following part along the following foot can be prevented from being made wide because of the hydrogen cylinder even if a seated rider's foot is placed in a foot rest position normally in front of a position of a seat if the end of the hydrogen cylinder is located substantially just beside the position of the seat of the vehicle.

In an embodiment of the present invention, when the hydrogen cylinder is substantially cylindrical and the end is tapered, the comfort for the rider is more enhanced when the rider places his/her feet in the foot rest by forming the end of the hydrogen cylinder so that it is spherical.

In an embodiment of the present invention, a body cover 42 is provided that covers the surface of the hydrogen cylinder. According to the configuration, the hydrogen cylinder is protected from water and flying debris and the appearance of the vehicle is kept satisfactory.

In an embodiment of the present invention, a sufficient stroke of the rocked driving wheel can be secured while lowering the center of the gravity of the vehicle.

In an embodiment of the present invention, the comfort can be enhanced when the rider places his/her feet on the vehicle while inhibiting the width of the body in the position along the rider's foot.

In an embodiment of the present invention, the comfort when the rider places his/her feet of the vehicle can be more enhanced.

In an embodiment of the present invention, the protection of the hydrogen cylinder can be enhanced and the appearance quality of the vehicle can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
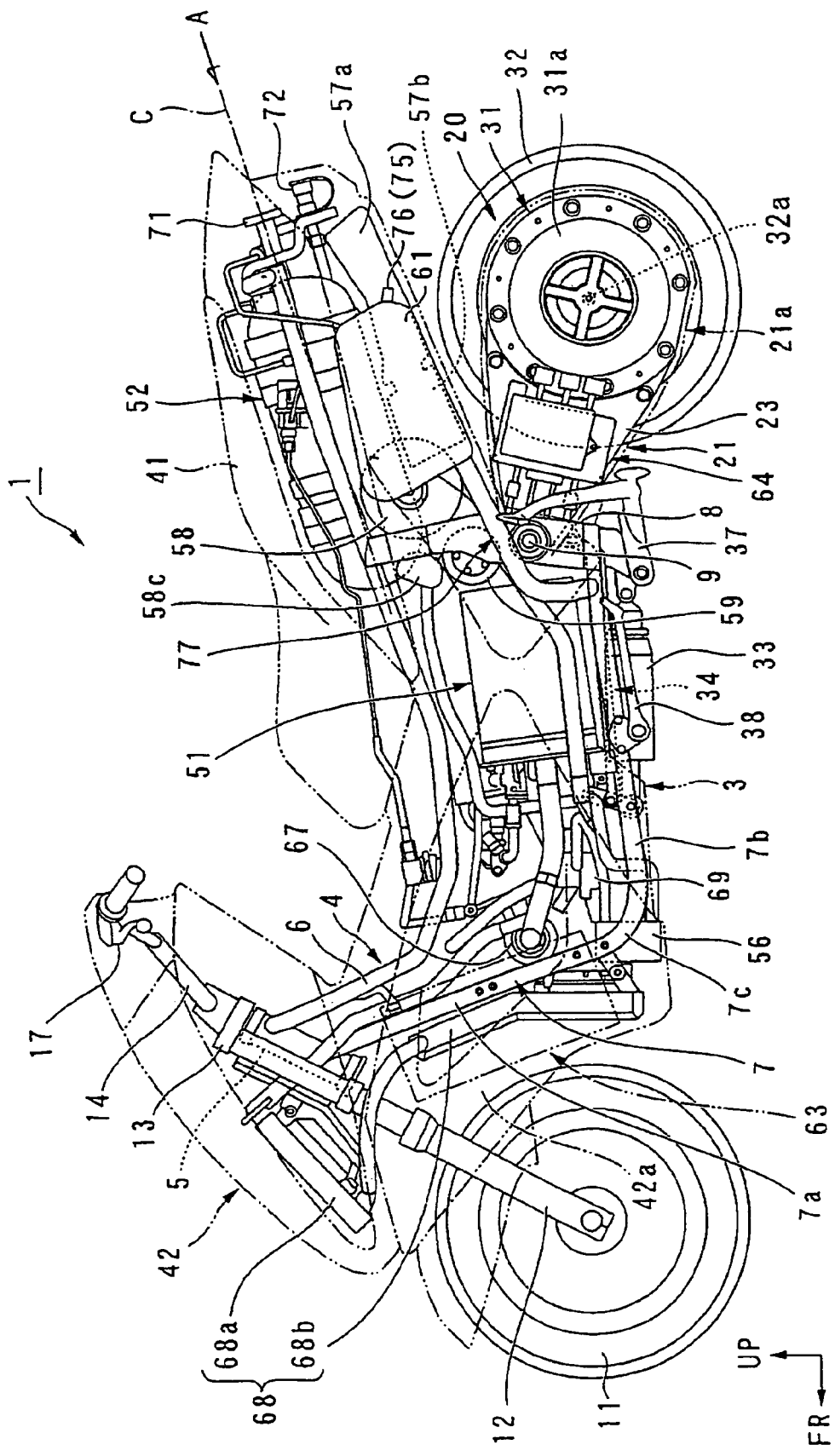
FIG. 1 is a left side view showing a fuel cell electric vehicle (a motorcycle) equivalent to an embodiment of the invention.

Referring to the drawings, an embodiment of the invention will be described below. A direction such as forward, rearward, rightward and leftward in the following description shall be the same as a direction in a vehicle unless special description is made. An arrow FR in the drawing indicates the front of the vehicle, an arrow LH indicates the left of the vehicle, and an arrow UP indicates the upside of the vehicle.

Figure 2:
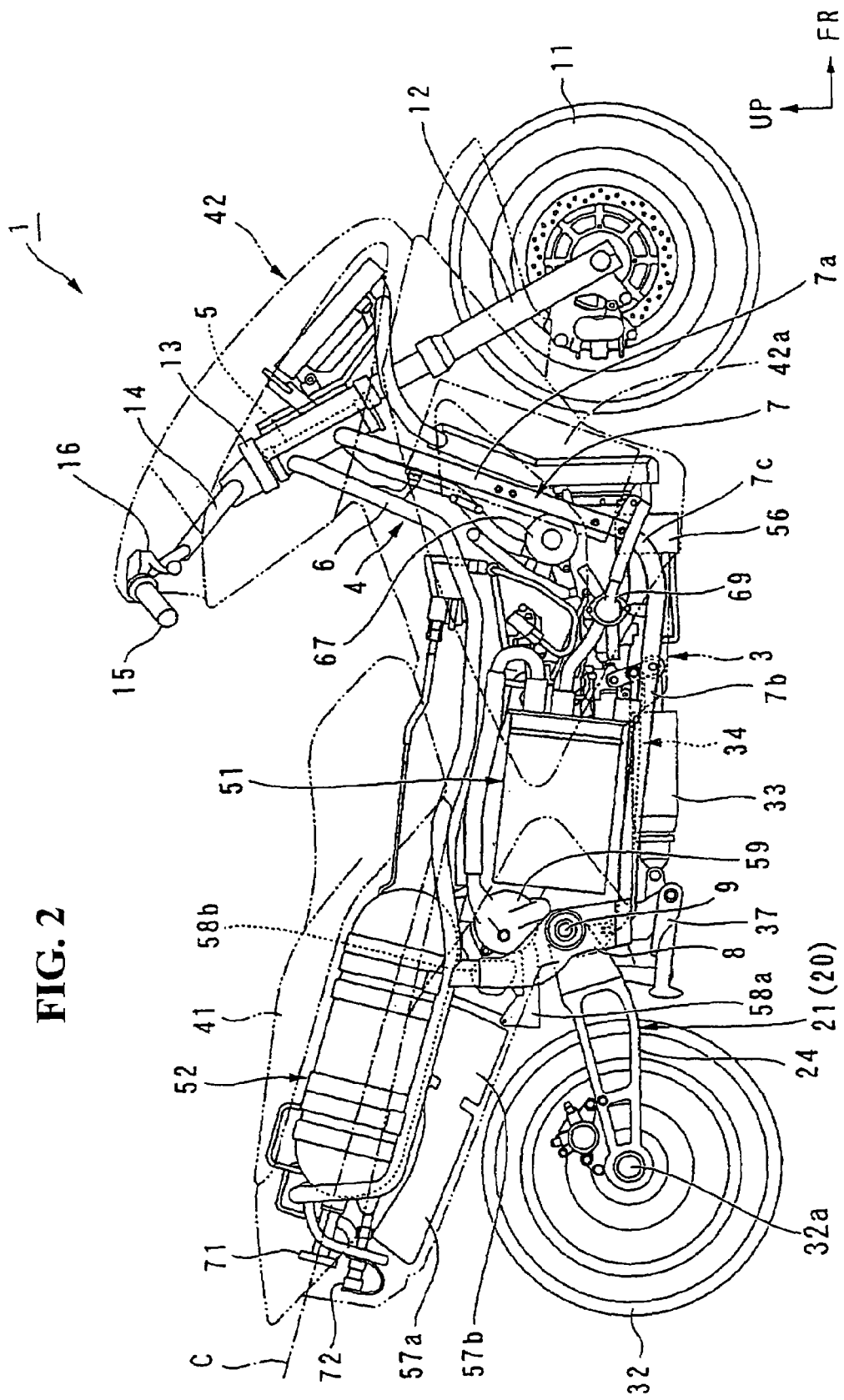
FIG. 2 is a right side view showing the fuel cell electric vehicle.
Figure 3:
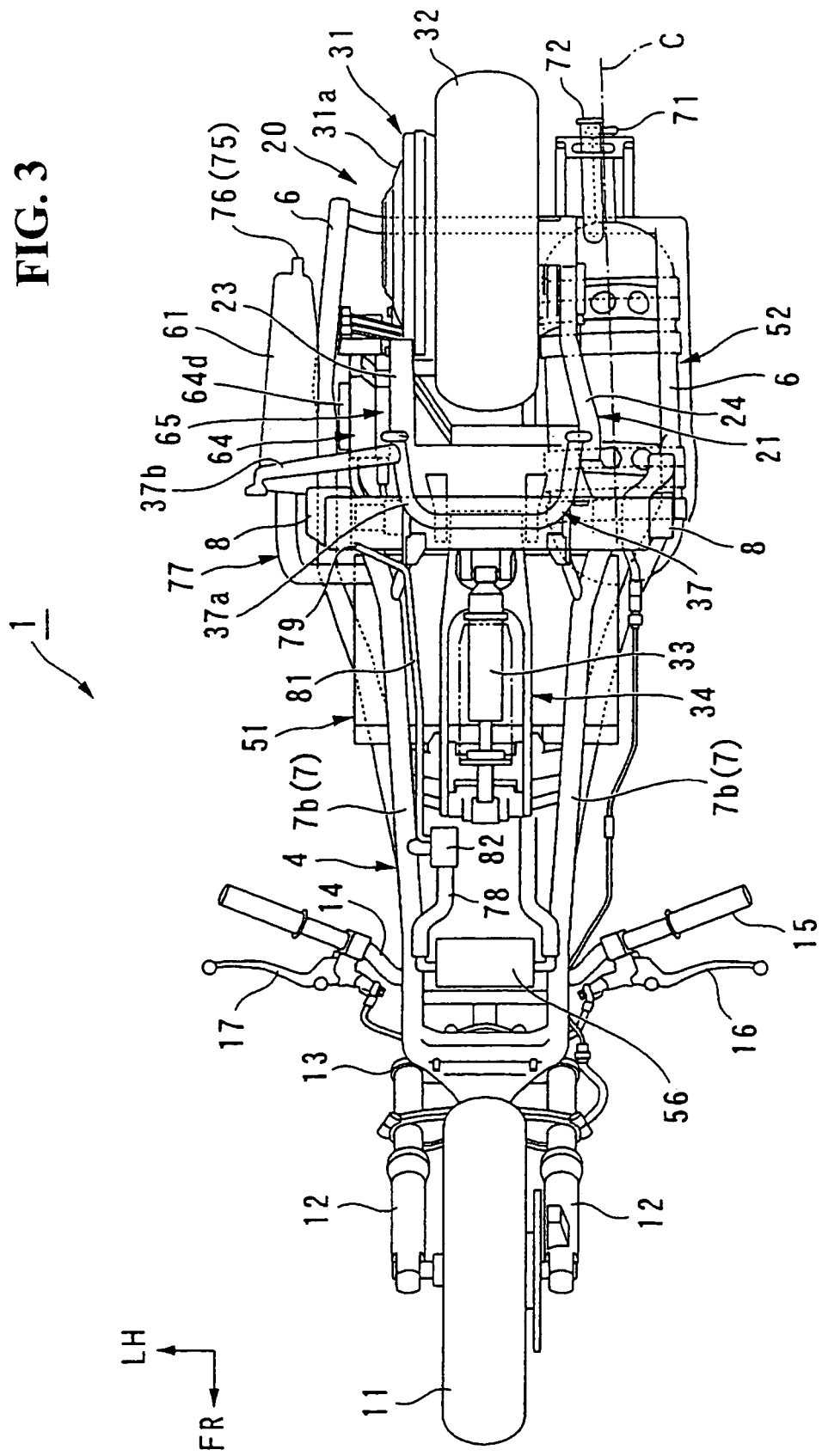
FIG. 3 is a bottom view showing the fuel cell electric vehicle.

A motorcycle 1 shown in FIGS. 1 to 3 is a fuel cell electric vehicle operated by driving a motor 31 for propelling the vehicle based upon electric power supplied from a fuel cell 51 mounted substantially in the center of the body. The motorcycle 1 may be a scooter-type vehicle provided with a low deck floor part (hereinafter merely called a floor part) 3, the rectangular parallelepipedic fuel cell 51 is arranged in the vicinity of the floor part 3, and the motor 31, in this embodiment a wheel-in motor, is arranged inside a rear wheel 32 which is a driving wheel of the motorcycle 1. The motor 31 is provided with the body of the motor and a deceleration mechanism in a casing 31a, is formed as an integrated unit, and is attached in the wheel from the left side for example in a state in which its output shaft is arranged coaxially with an axle 32a of the rear wheel.

A front wheel 11 of the motorcycle 1 is supported by the lower ends of a pair of right and left front forks 12 and the upside of each front fork 12 is supported by a head pipe 5 at the front end of a body frame 4 via a steering stem 13 so that the front fork can be steered. A handlebar 14 is attached to the upper end of the steering stem 13, a throttle grip 15 is arranged on a right grip of the handlebar 14, and a rear brake lever 16 and a front brake lever 17 are arranged in front of the left and right grips.

A pivot plate 8 extends in a vertical direction of the body and is provided to the rear of the body frame 4 and the front end of a rear swing arm 21 is supported via a pivot 9 by a slightly lower part of an intermediate part of the pivot plate 8 so that the side of the rear end can be vertically rocked. A left arm body 23 of the rear swing arm 21 extends up to the front end of the motor 31 and supports the casing 31a of the motor 31, while a right arm body 24 extends up to a center position of the rear wheel 32 and supports the axle 32a of the rear wheel. A motor unit 20 is provided as a swing unit of the motorcycle 1 (in other words, a rear frame for supporting the rear wheel 32 so that the rear wheel can be rocked) that is formed mainly by the above-mentioned rear swing arm 21 and the motor 31.

A rear shock absorber 33 extends longitudinally and is arranged below the body frame 4 and under the fuel cell 51. The rear end of the rear shock absorber 33 is coupled to a lower part of the body frame 4 and the front end of the rear shock absorber 33 is coupled to a lower part of the motor unit 20 (the rear swing arm 21) via a link mechanism 34. The link mechanism 34 strokes the rear shock absorber 33 longitudinally according to the vertical rocking of the motor unit 20 so that shock and vibration input to the motor unit 20 are absorbed by the stroke of the rear shock absorber 33.

The body frame 4 is provided with an upper tube 6 branched toward the right and the left from an upper part of the head pipe 5, that extends diagonally rearwardly and downwardly and extends rearwardly after being bent in height equivalent to substantially a middle portion in a vertical direction of the body. A down tube 7 is branched toward the right and the left from a lower part of the head pipe 5, extends diagonally rearwardly and downwardly and extends rearwardly after being bent at the lower end of the body. The rear end of each of the upper tube 6 and the rear end of the down tube 7 are coupled to the upper end and the lower end of the pivot plate 8 located at the back of the fuel cell 51. Hereinafter, a part of the down tube 7 from the head pipe 5 to a bent part 7c at the lower end of the body will be described as a front side 7a and a part from the bent part 7c to the pivot plate 8 will be described as a lower side 7b.

Each upper tube 6 extends further rearwardly from the pivot plate 8 toward the rear end of the body and a rear half of each upper tube 6 is used for a seat frame for supporting a seat for occupants 41. A front half of the seat 41 is used for an operator of the motorcycle 1 and a rear half is a part for a rear passenger.

The body of the motorcycle 1 is covered with a body cover 42 mainly made of a synthetic resin. The body cover 42 also functions as a windshield and a part forms the floor part 3 together with the body frame 4. A main stand 37 for supporting the body in an upright state is attached to the center of the lower part of the body frame 4 and a side stand 38 for supporting the body in a state in which the body is inclined to the left is attached to the left side of the lower part of the body frame 4.

Figure 4:
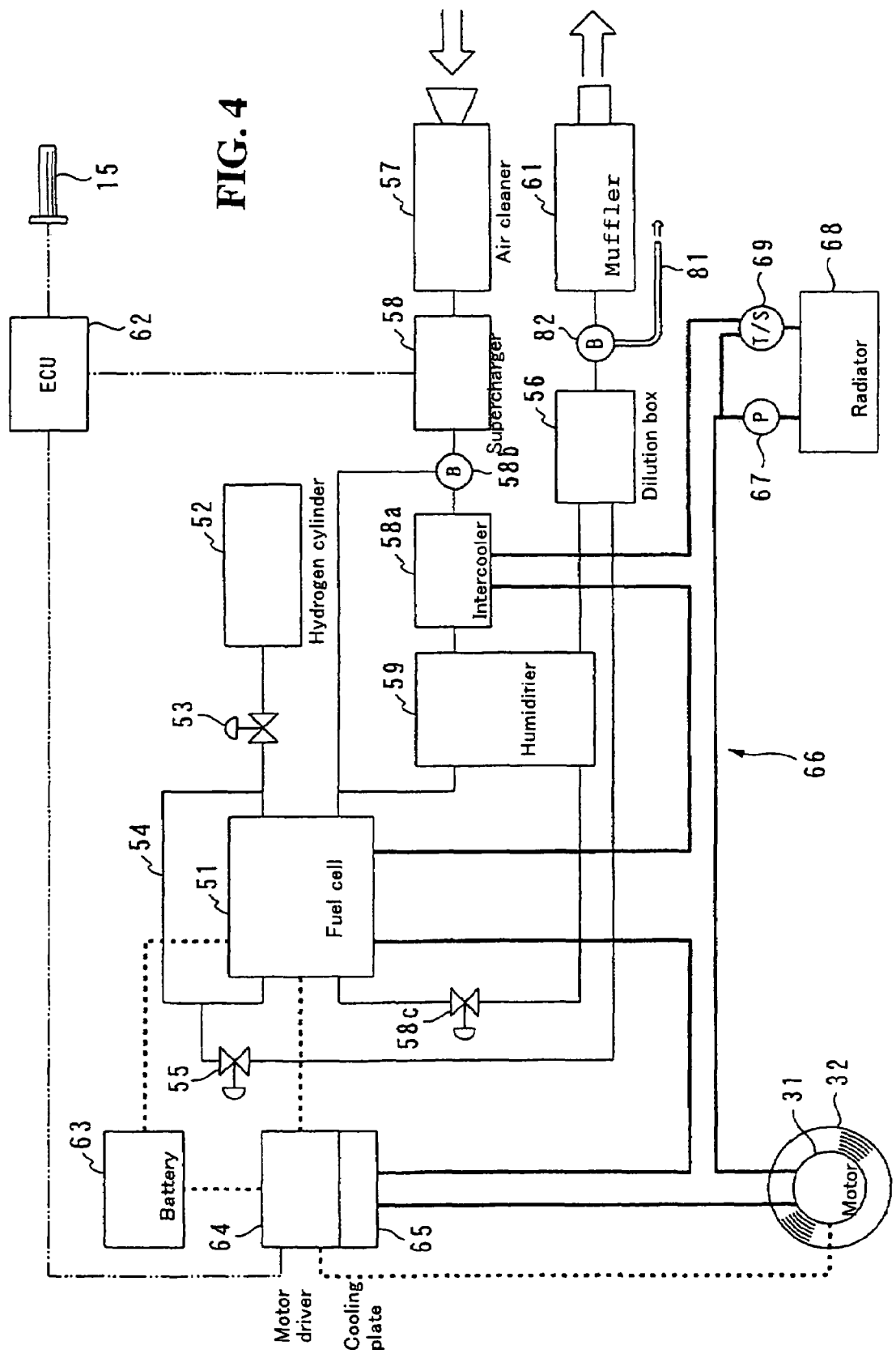
FIG. 4 is a block diagram showing a main part of a fuel cell system in the fuel cell electric vehicle.

Referring to FIG. 4, the outline of a fuel cell system of the motorcycle 1 will be described below.

The fuel cell 51 is a well-known polymer electrolyte fuel cell (PEMFC) acquired by laminating multiple battery modules (battery cells), for generating electric power by electrochemical reaction and for generating water by supplying gaseous hydrogen as fuel gas to the anode side and supplying air including oxygen as oxidizer gas to the cathode side.

Gaseous hydrogen as a fuel gas is supplied from a hydrogen cylinder 52 to the fuel cell 51 via a cut-off valve 53 under a predetermined pressure (in other words, in a predetermined high-pressure state) and after the gaseous hydrogen is used for power generation, the gaseous hydrogen is led into a hydrogen circulating passage 54. In the hydrogen circulating passage 54, unreacted gaseous hydrogen is repeatedly supplied to the fuel cell 51 together with fresh gaseous hydrogen from the hydrogen cylinder 52. Gaseous hydrogen circulated in the hydrogen circulating passage 54 can be led into a dilution box 56 via a purging valve 55.

In addition, air as oxidizer gas is supplied to the fuel cell 51 in a state that is pressurized by predetermined pressure after it is led into a supercharger 58 via an air cleaner 57 and is led into the dilution box 56 after it is used for power generation. An n inter-cooler 58a is provided for cooling air (oxidizer gas) supplied to the fuel cell 51. A humidifier 59 is provided for supplying moisture to the oxidizer gas. A bypass valve 58b is provided for supplying air without passing the inter-cooler 58a and the humidifier 59 when the fuel cell 51 is at low temperature. A back pressure valve 58c is provided for adjusting the pressure of oxidizer gas in the fuel cell 51.

When the purging valve 55 operatively connected to the hydrogen circulating passage 54 is opened, gaseous hydrogen after reaction is led into the dilution box 56. After gaseous hydrogen stored in the dilution box 56 is mixed with air emitted from the fuel cell 51 and similarly stored in the dilution box 56 and is diluted, it is emitted into the air via a muffler 61.

Water generated in the fuel cell 51 is extracted when it is led into the humidifier 59 together with emitted air and is reutilized for moisture supplied to oxidizer gas. Moisture (for example, water vapor) not extracted into the humidifier 59 is exhausted together with reacted gas via the dilution box 56 or is exhausted via a drainage pipe 81 after the moisture is condensed in the dilution box 56. A control valve 82 for opening or closing a channel at a predetermined time (for example, every predetermined time) is provided on the drainage pipe 81.

The operation of the fuel cell 51 is controlled by an electronic control unit (ECU) 62. More specifically, a signal related to the pressure and the temperature of gaseous hydrogen and oxidizer gas, a signal related to vehicle speed and the number of revolutions of the supercharger 58 and a signal related to the fuel cell 51 and the temperature of its cooling water are input to ECU 62, and the operation of the supercharger 58, the bypass valve 58*b*, the back pressure valve 58*c*, the purging valve 55 and the cut-off valve 53 is controlled according to each of these signals.

In addition, an acceleration request signal from the throttle grip 15 is input to the ECU 62 and the drive of the motor 31 for driving the rear wheel 32 that is controlled according to the signal. The motor 31 is a three-phase motor driven when direct current from the fuel cell 51 or a battery 63 as a secondary battery is supplied after the direct current is converted to three-phase alternating current in a motor driver 64 as an inverter unit.

A cooling system in the fuel cell system is formed for providing communication with a cooling channel 66 for making each channel in a water jacket of the fuel cell 51 and the motor 31 be in communication in the inter-cooler 58*a* and in a cooling plate (a cooler) 65 adjacent to the motor driver 64. A water pump 67 and a radiator 68 are provided to the cooling channel 66.

In such a cooling system, as cooling water is circulated in the cooling channel 66 by the operation of the water pump 67, heat is absorbed from the fuel cell 51, the motor 31, oxidizer gas and the motor driver 64 and the heat is radiated by the radiator 68. A thermostat 69 is provided for circulating cooling water without passing the radiator 68 when the fuel cell 51 is at low temperature.

To explain referring to FIGS. 1 to 3, the hydrogen cylinder 52 is a general high-pressure gas cylinder having a cylindrical appearance and is a general compound reservoir made of metal and fiber reinforced plastic. Such a hydrogen cylinder 52 is arranged above the rear wheel 32 and on the right side of the rear of the body so that the axis (the center line) C is longitudinal. In more detail, the axis C is inclined slightly downwardly in a forward direction. The hydrogen cylinder 52 at this time is arranged so that the right side end (the outside end) is located slightly outside the outside end of the upper tube 6 on the right side of the body and the left side end (the inside end) is located slightly outside the outside end of the rear wheel 32.

The front and rear ends of the hydrogen cylinder 52 are formed spherically (in other words, in a tapered state) and the hydrogen cylinder is arranged so that the front end is located in front of the pivot plate 8 and the rear end is located at the rear end of the body. A hydrogen cylinder 52, a main tap 71 of the hydrogen cylinder 52 and a hydrogen filling port 72 are arranged at the rear end thereof.

The upper tube 6 on the left side of the body is inclined rearwardly and slightly upwardly and extends substantially linearly rearwardly, while the upper tube 6 on the right side of the body extends gently downwardly in the vicinity of the pivot plate 8, compared with the upper tube 6 on the left side of the body. Each such upper tube 6 is gently directed outside in a direction of the width of the body in the vicinity of the pivot plate 8.

In addition, the upper tube 6 on the right side of the body is provided so that the lower end is substantially overlapped with the lower end of the hydrogen cylinder 52 when the body is viewed from the side, is bent upwardly at the rear end of the body, is bent downwardly after the upper tube extends towards the left side of the body to avoid the main tap 71 of the hydrogen cylinder 52 and the hydrogen filling port 72, and is coupled to the rear end of the upper tube 6 on the left side of the body.

The fuel cell 51 is wide in the direction of the width of the body and is vertically flat. In addition, a supply port and an exhaust port of oxidizer gas and gaseous hydrogen, an inlet and an outlet of cooling water are provided adjacent to the front wall.

Figure 6:
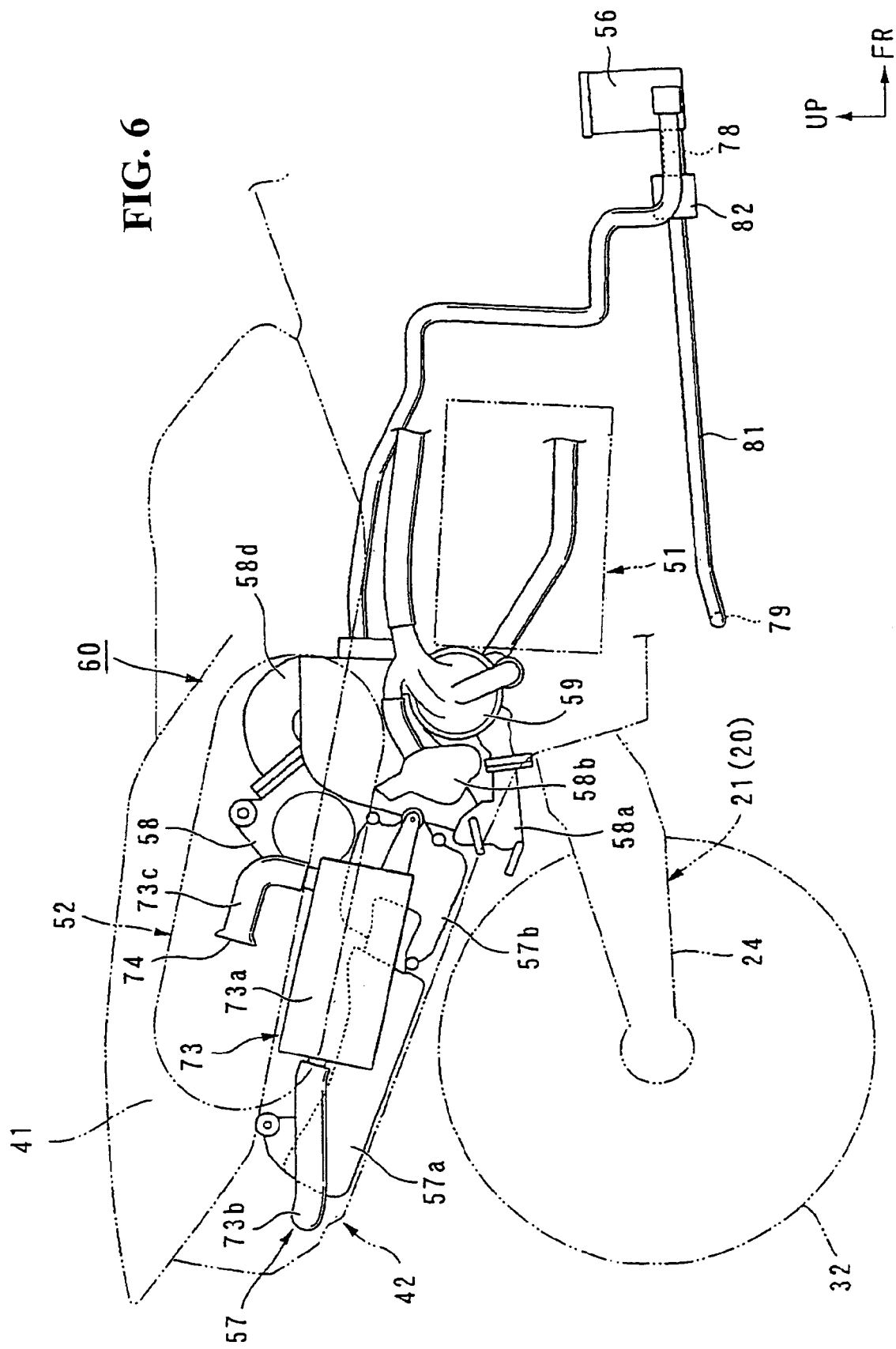
FIG. 6 is a right side view showing intake/exhaust members in the fuel cell electric vehicle.
Figure 7:
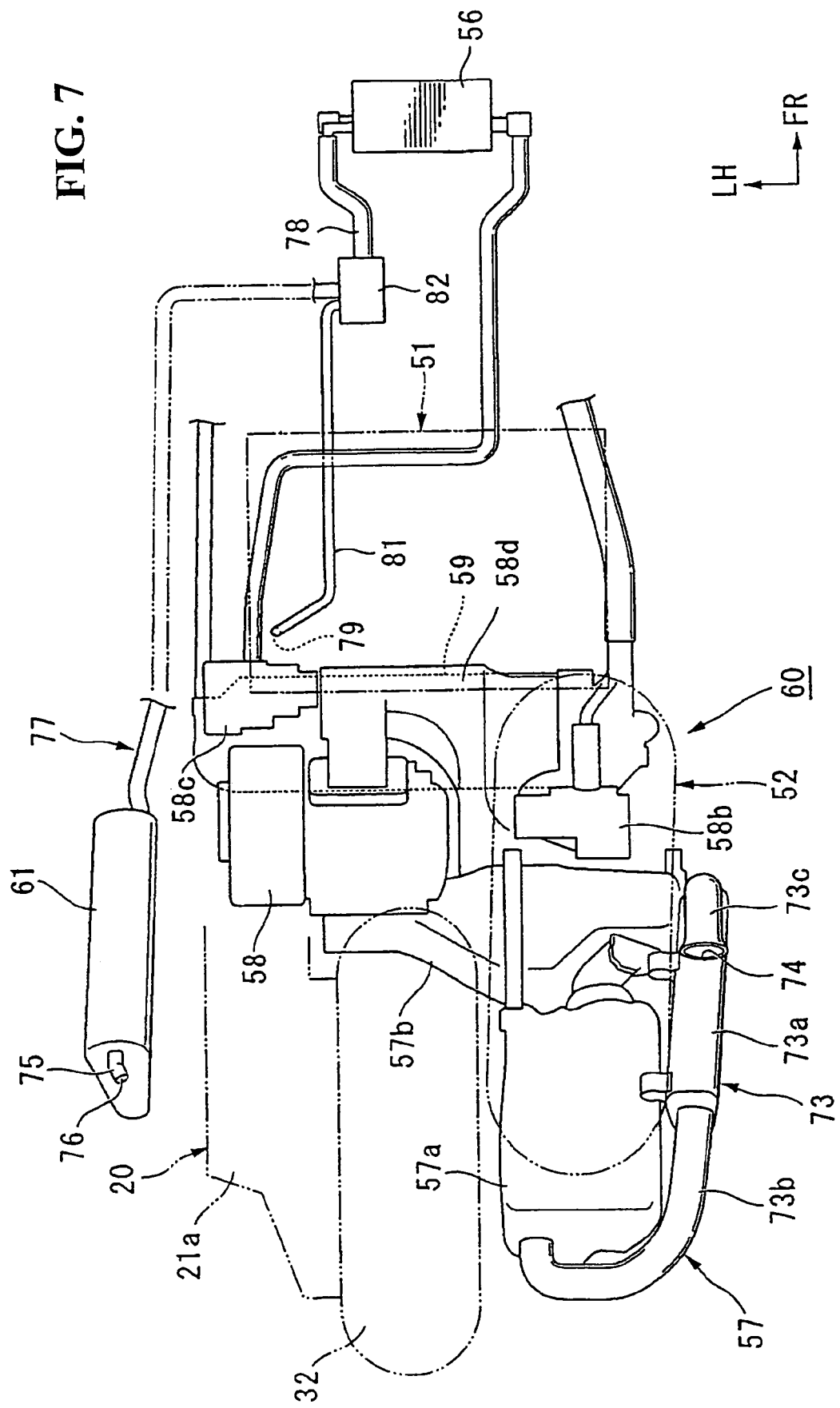
FIG. 7 is a top view showing the intake/exhaust members.

To explain also referring to FIGS. 6 and 7, the humidifier 59 having a body that is long in the direction of the width of the body is arranged closely on the upside and at the back of the fuel cell 51. The supercharger 58 is arranged closely on the diagonally upside and at the back of the left side of the humidifier 59 and the left side of an introduction duct 57*b* extends in the direction of the width of the body and is connected to the diagonally lower rear of the supercharger 58. The back pressure valve 58*c* is arranged closely over the left side of the humidifier 59.

The introduction duct 57*b* is provided so that the right side is located under the hydrogen cylinder 52 and the front end of an air cleaner case 57*a* located similarly under the hydrogen cylinder 52 is connected to the right side. An intake duct 73 is connected to the rear end of the air cleaner case 57*a* and the air cleaner 57 is configured mainly by the intake duct 73, the air cleaner case 57*a* and the introduction duct 57*b*.

The intake duct 73 is arranged closely on the right side of the air cleaner case 57*a* and the introduction duct 57*b* and extends longitudinally there along. The intake duct 73 is provided with the body 73*a* of the duct as a chamber flat in the direction of the width of the body. A connecting tube 73*b* is bent after the connecting tube extends rearwardly from the rear end of the body 73*a* of the duct and is connected to the rear end of the air cleaner case 57*a*. An intake nozzle 73*c* is bent rearwardly after the intake nozzle extends upwardly from the front side of the upper end of the body 73*a* of the duct, and the intake nozzle 73*c* forms a funnel-shaped intake port 74 that opens towards the back in a position on the upside of the rear wheel 32. The intake port 74 is surrounded by the seat 41 and the body cover 42 and the invasion of debris and foreign matter such as water, mud and dust is inhibited.

The bypass valve 58*b* is arranged closely at the back of the right side of the humidifier 59 and the inter-cooler 58*a* is arranged closely at the diagonally lower back of the bypass valve 58*b*. The bypass valve 58*b* and the inter-cooler 58*a* are arranged so that they are located between the right side of the humidifier 59 and the right side of the introduction duct 57*b* in a longitudinal direction of the body. One end of a lead-through duct 58*d* is connected to a squirt hole located in the diagonally upper front of the supercharger 58 and the other end of the lead-through duct 58*d* extends rightwardly, being bent to avoid the front end of the hydrogen cylinder 52 and is connected to an inlet of the inter-cooler 58*a*.

The muffler 61 is flat in the direction of the width of the body and is arranged on the left side of the rear of the body so that the muffler is located outside the upper tube 6 on the left side of the body in the direction of the width of the body. The muffler 61 is substantially rectangular when it is viewed from the side of the body and is arranged in a state inclined so that the rear is located higher on the diagonally upper left side of the rear wheel 32. The muffler 61 is provided to a rear half of an exhaust pipe 77 that is inclined so that the rear is located higher. A tail pipe 75 projects rearwardly from the rear end of the muffler 61 (the exhaust pipe 77), and an exhaust port 76 of reacted gas is formed at the rear end of the tail pipe 75.

The muffler 61 (the exhaust pipe 77) is arranged on the left side of the rear wheel 32, while the air cleaner 57 is arranged on the right side of the rear wheel 32. The muffler 61 and the air cleaner 57 are both arranged at the back of the fuel cell 51. The muffler 61 and the air cleaner 57 are arranged on the left and on the right with the rear wheel 32 between them in the rear of the body as described and above separated from the exhaust port 76 and the intake port 74 by a predetermined amount for locating the intake port 74 on the upside by a predetermined amount adjacent to the rear wheel 32.

Intake members including the air cleaner 57, the supercharger 58, the bypass valve 58b, the inter-cooler 58a and the humidifier 59 and exhaust members including the back pressure valve 58c and the muffler 61 (the exhaust pipe 77) are mutually arranged close to the back of the fuel cell 51, that is, in the rear of the body. An intake/exhaust module 60 is formed by integrating each intake member and each exhaust member via a coupling stay not shown and other stays.

The radiator 68 is divided into a relatively small upper radiator 68a located in front of the head pipe 5 and a relatively large lower radiator 68b located in front of the front side 7a of each down tube 7. The water pump 67 is arranged at the back of the right side of the lower radiator 68b and the thermostat 69 is arranged at the back of the diagonally downside of the water pump 67. The battery 63 is flat in the direction of the width of the body and is arranged inside each body cover 42 located on both sides of the lower radiator 68b.

As shown in FIGS. 1, 2, 8 and 11, a part on the front lower side of the body cover 42 is equivalent to a front side cover 42a covering the lower radiator 68b and an upper part of the front wheel 11 from both sides. The battery 63 that is flat in the direction of the width of the body is arranged inside each front side cover 42a.

The leading edge of each front side cover 42a is provided in an inclined state so that a lower position when the body is viewed from the side is located further behind and an intake port 42b that is vertically long along the leading edge is provided to the leading edge. Each intake port 42b is opened towards the front of the body and outside air can be taken inside the front side cover 42a when the motorcycle 1 is operated.

In addition, an exhaust port 42c from which outside air taken from the intake port 42b can be exhausted is provided to a lower end of the rear of each front side cover 42a. Outside air can be circulated inside each front side cover 42a by providing each intake port 42b and each exhaust port 42c. Thus, the battery 63 that is arranged inside the front side cover 42a can be cooled.

As shown in FIGS. 1 to 3, the dilution box 56 is arranged between the bent parts 7c of each down tube 7 so that the dilution box projects downwardly from the lower end of the lower side 7b. An exhaust short pipe 78 is led out of the dilution box 56 and is connected to the front side of the lower side 7b of the down tube 7 on the left side of the body. The exhaust pipe 77 is led from the rear side of the lower side 7b. More specifically, the down tube 7 on the left side of the body forms a part of an exhaust path of reacted gas. Therefore, gas emitted from the dilution box 56 is exhausted into the air via the exhaust short pipe 78, the lower side 7b of the down tube 7 and the exhaust pipe 77.

The drainage pipe 81 is branched from an intermediate part of the exhaust short pipe 78 via the control valve 82 and extends rearwardly along the lower side 7b of the down tube 7 on the left side of the body. The control valve 82 is closed at a normal time for example for closing a waterway of the drainage pipe 81 for permitting the flow of only exhaust gas. When the control valve is opened only for fixed time at a predetermined time, the exhaust gas flow, and can exhaust water stored in the dilution box 56 outside the body via the drainage pipe 81.

Figure 5:
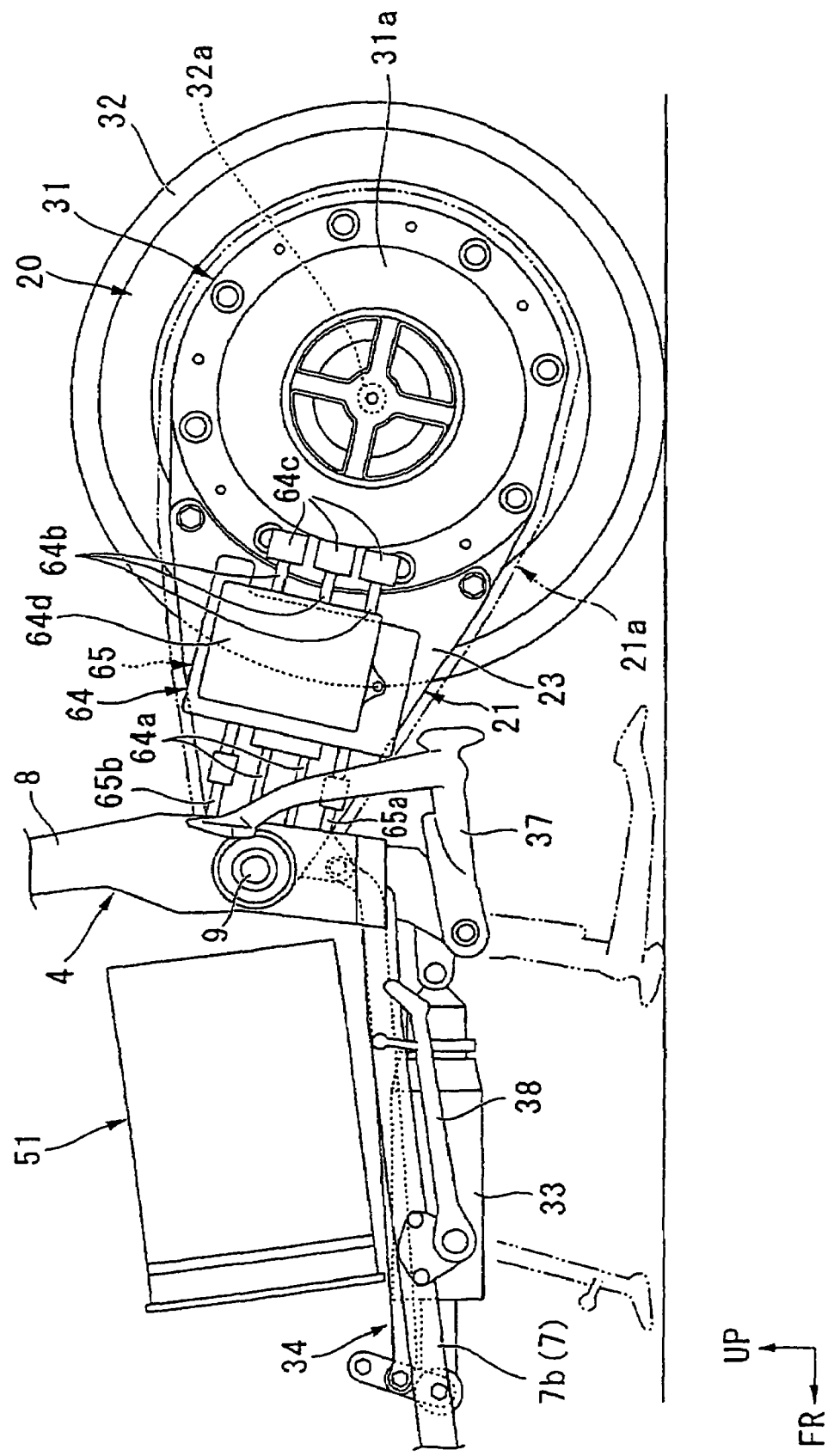
FIG. 5 is an enlarged view showing a main part in FIG. 1.

To explain also referring to FIG. 5, the motor driver 64 is substantially rectangular when the body is viewed from the side and is attached to the outside in the direction of the width of the body of the left arm body 23 of the rear swing arm 21 via the cooling plate 65. High-voltage wiring 64a for supplying electric power from the fuel cell 51 and the battery 63 is connected to the front end of the motor driver 64. A feed pipe 65a and a drainage pipe 65b which are a part of the cooling channel 66 are connected to a lower part and an upper part of the front end of the cooling plate 65.

Three-phase high-voltage wirings 64b are led out from the rear end of the motor driver 64 and each-phase high-voltage wiring 64b is connected to a feeding terminal at the front end of the motor 31 located immediately at the back of the motor driver 64. More specifically, the motor driver 64 is arranged close to the motor 31 to an extent that the motor driver is not overlapped with the motor when the body is viewed from the side. A current sensor 64c is provided for each-phase high-voltage wiring 64b for detecting an amount of current fed to the motor 31. A voltage smoothing capacitor 64d is provided as a part of the motor driver 64.

An arm cover 21a as a part of the rear swing arm 21 is mounted on the motor unit 20. The arm cover 21a covers and protects the motor driver 64, the cooling plate 65, the voltage smoothing capacitor 64d, each high-voltage wiring 64a, 64b, the feed pipe 65a, the drainage pipe 65b and the current sensor 64c together with rear swing arm 21 and the motor 31. A fresh-air inlet and a fresh-air outlet not shown are provided to the arm cover 21a so that outside air can be circulated inside the arm cover 21a.

Figure 9:
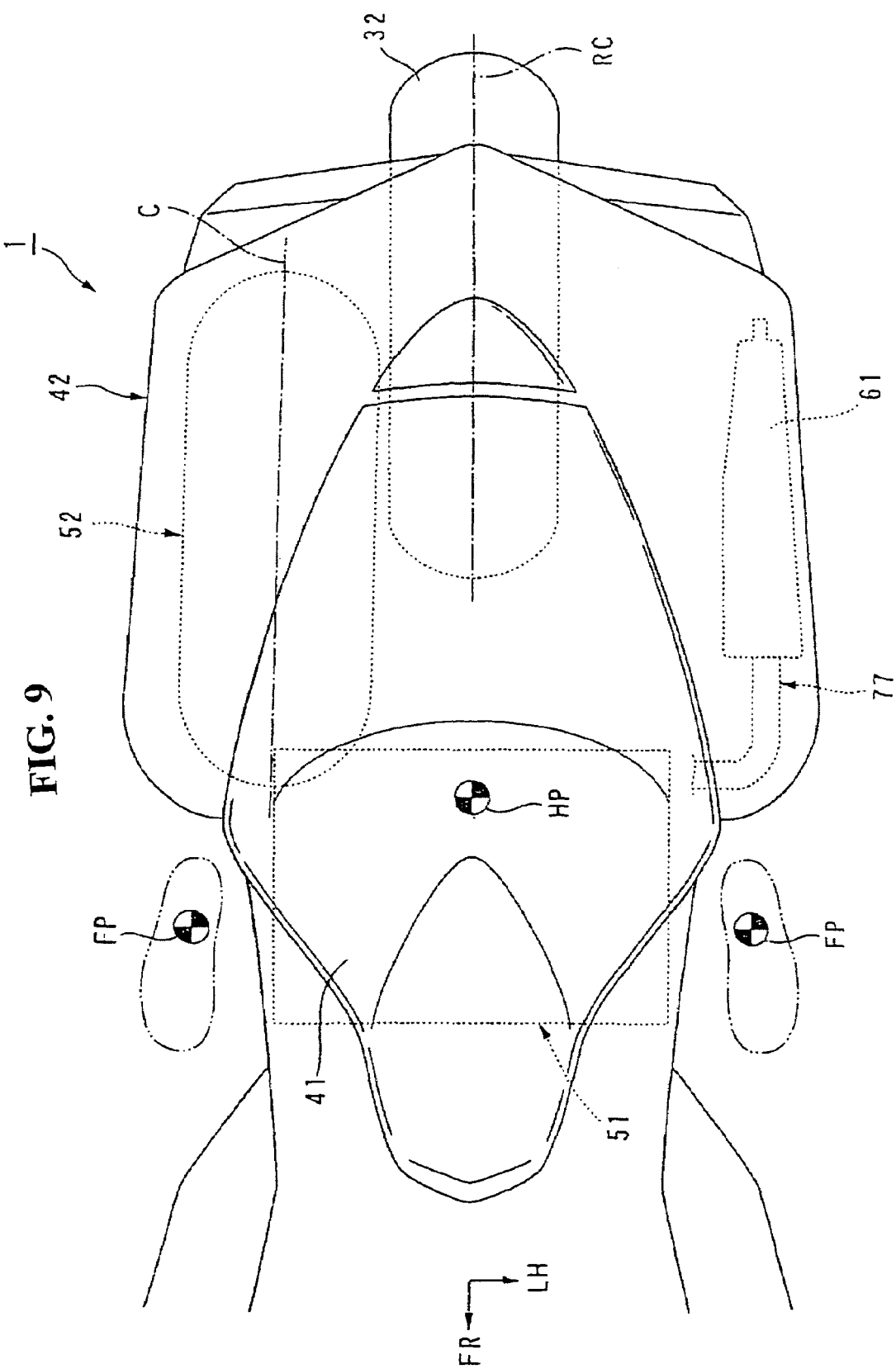
FIG. 9 is a top view showing the rear of the fuel cell electric vehicle.
Figure 10:
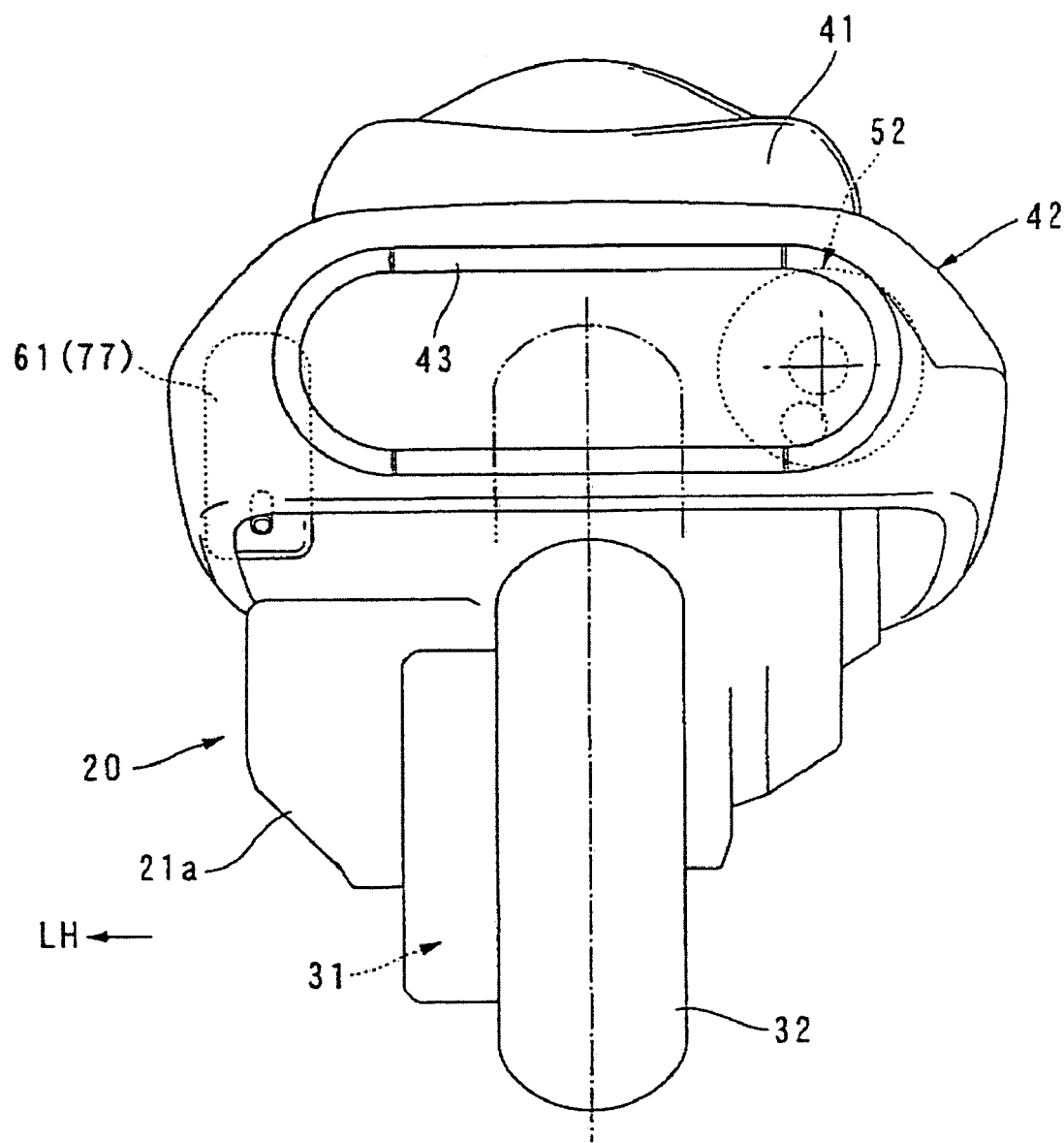
FIG. 10 shows a part viewed along a line A in FIG. 1.
Figure 11:
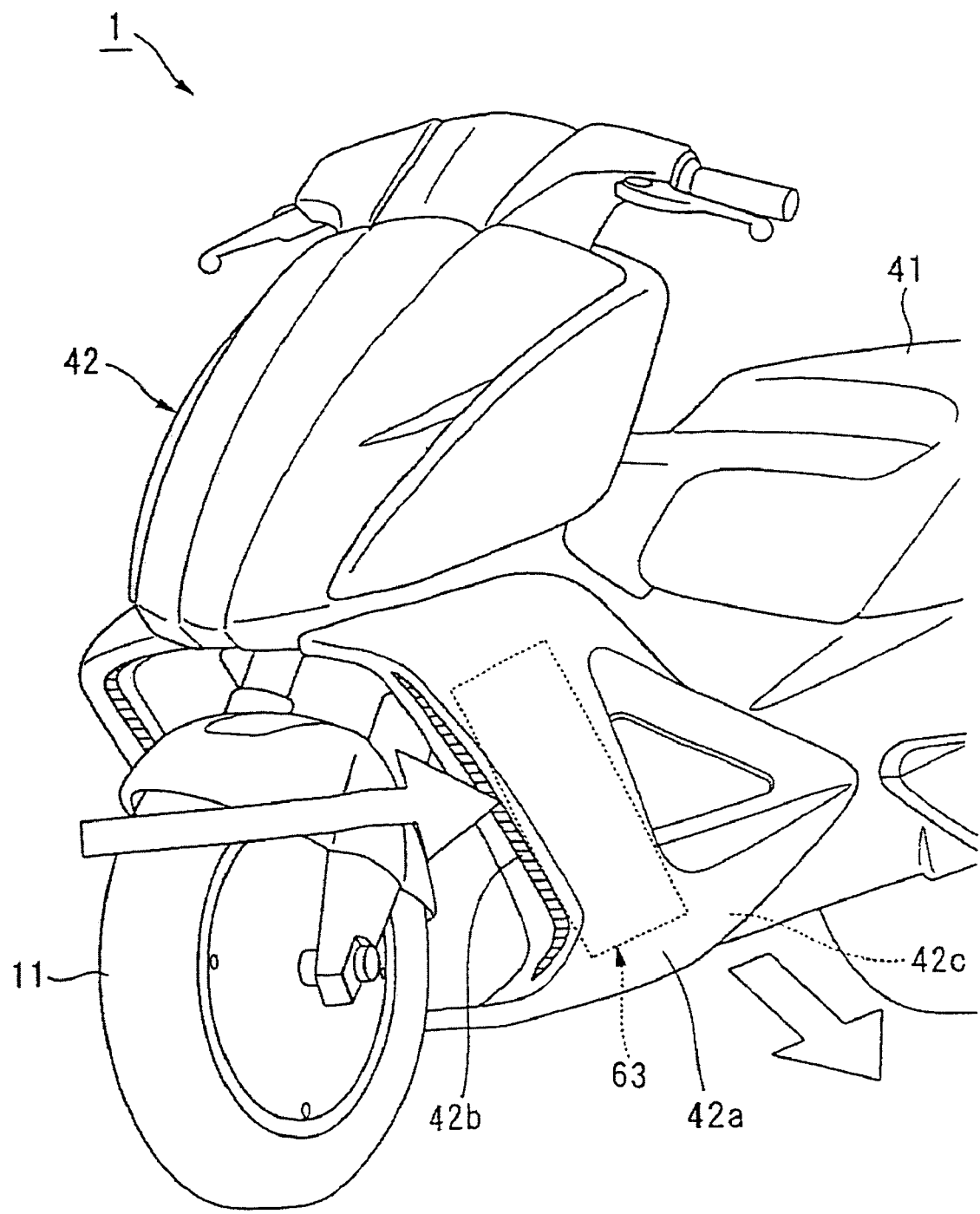
FIG. 11 is a perspective view showing the fuel cell electric vehicle viewed from the left diagonally front.

As shown in FIG. 9, the hydrogen cylinder 52 is arranged so that the left side end (the inside end) is located outside the outside end of the rear wheel 32, in other words, the axis C of the hydrogen cylinder 52 is off a plane passing the center in the direction of the width of the rear wheel 32 (shown in the drawing as a center line RC in the direction of the width of the rear wheel 32) on the right side of the body. Therefore, the hydrogen cylinder 52 and the rear wheel 32 are not overlapped in the direction of the width of the body. Therefore, as shown in FIG. 10, when the rear wheel 32 is rocked upward together with the motor unit 20, the rear wheel 32 and the hydrogen cylinder 52 also interfere with each other. The plane passing the center in the direction of the width of the rear wheel 32 is also a center plane of the body. A tail lamp 43 is provided without an end substantially elliptic when the body is viewed from the back.

Figure 8:
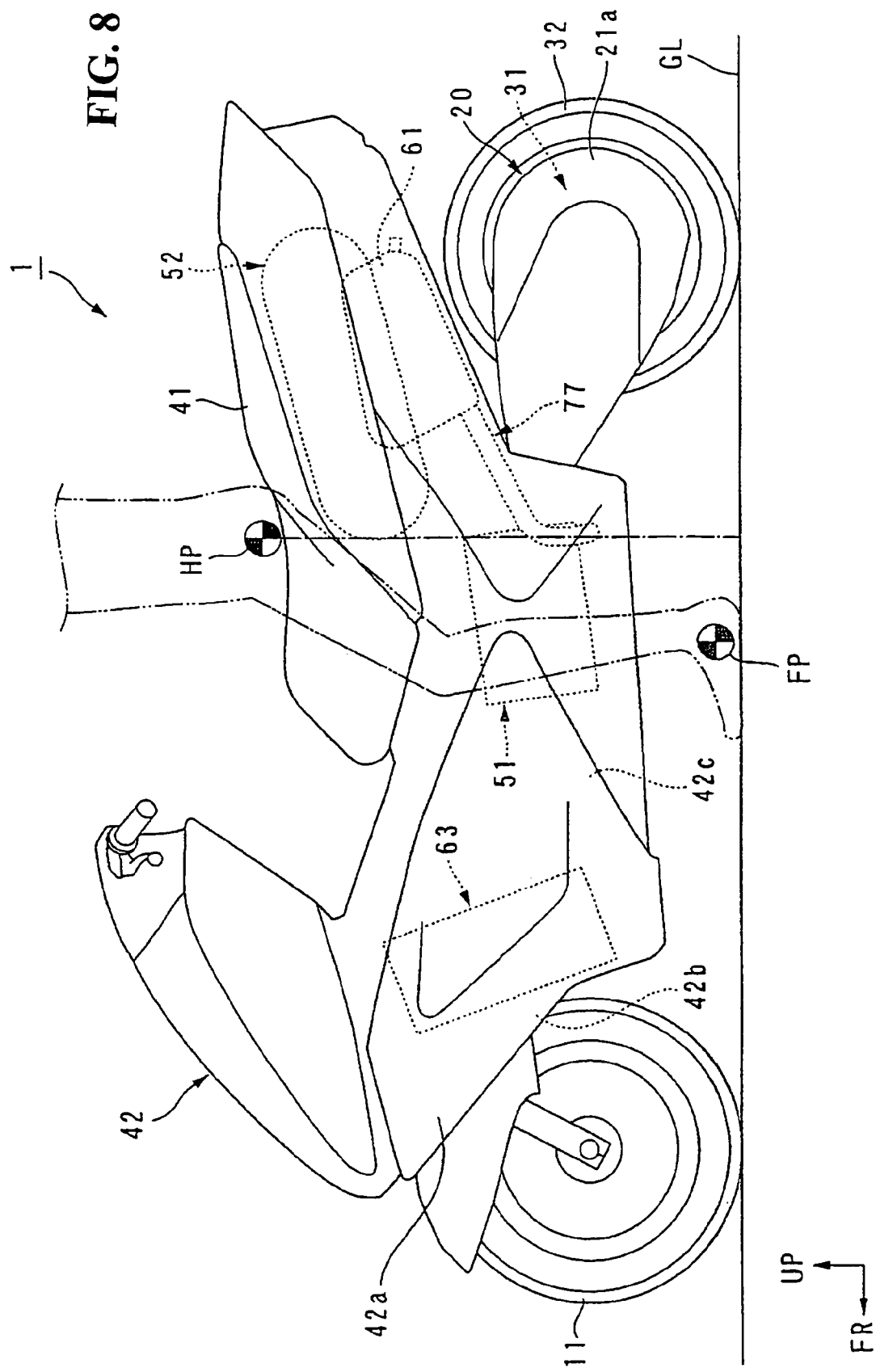
FIG. 8 is a left side view showing a state in which a rider rides on the fuel cell electric vehicle.

As shown in FIGS. 8 and 9, the hydrogen cylinder 52 is arranged so that the position of the front end is substantially the same in the longitudinal direction as a rider's seated reference position (hereinafter merely called a seated position) HP of the seat 41.

A code FP in FIGS. 8 and 9 denotes a foot position reference position (hereinafter merely called a foot position) when the operator seated on the seat 41 puts his/her feet on the ground (shown by a line GL) while the vehicle is stopped and the foot position FP is located in front of the seated position HP, that is, in front of the front end of the hydrogen cylinder 52.

As the left side of the body cover 42 covers and protects the muffler 61 (the exhaust pipe 77) in a part at the back of the seated position HP and the right side covers the hydrogen cylinder 52. The substantially same part in the longitudinal direction of such a body cover 42 as the seated position HP is formed spherically along the curved shape of the exhaust pipe 77 to correspond to the shape at the front end of the hydrogen cylinder 52.

As described above, the fuel cell electric vehicle (the motorcycle 1) in the embodiment is provided with the fuel cell 5 for generating electric power by reacting hydrogen and oxygen, the hydrogen cylinder 52 for supplying gaseous hydrogen to the fuel cell 51 and the motor 31 for generating motive power supplied to the rear wheel 32 which is a driving wheel based upon electric power generated by the fuel cell 51, the hydrogen cylinder 52 is arranged above the rear wheel 32 so that its longitudinal direction is along the longitudinal direction of the body, and the axis C along the longitudinal direction of the hydrogen cylinder 52 is located off the center line RC in the direction of the width of the rear wheel 32.

According to the configuration, clearance between the hydrogen cylinder 52 and the rear wheel 32 can be secured without merely moving the hydrogen cylinder 52 upwardly. That is, in the motorcycle 1 in which the rear wheel 32 is attached to the motor unit 20 supported by the body frame 4 so that the motor unit can be rocked, a sufficient stroke of the rocked rear wheel 32 can be secured, lowering the center of the gravity of the vehicle.

In the above-mentioned fuel cell electric vehicle, as the end of the hydrogen cylinder 52 is located substantially just beside the seated position HP of the motorcycle 1 which is a saddle-ride type vehicle, the width of the body in the following part along the foot can be prevented from being wider by the hydrogen cylinder 52 even if the seated rider places his/her foot in the foot position FP normally located in front of the seated position HP. That is, the width of the body in the part along the rider's foot is inhibited and the comfort in putting his/her foot of the vehicle can be enhanced.

Further, in the fuel cell electric vehicle, as the hydrogen cylinder 52 is substantially cylindrical and the end is tapered (concretely, spherical), the comfort in placing his/her foot on the vehicle can be more enhanced.

Furthermore, in the fuel cell electric vehicle, the body cover 42 covering the hydrogen cylinder 52 is provided. Thus, the hydrogen cylinder 52 can be protected from debris such as water and flying gravel and the appearance quality of the vehicle can be kept satisfactorily maintained.

In the above-mentioned embodiment, the configuration that the hydrogen cylinder 52 is arranged on one side (on the right side) off the center line RC of the driving wheel (the body) is described as an example. However, two hydrogen cylinders (for example, a left hydrogen cylinder and a right hydrogen cylinder) are provided and may be also arranged off the center line RC. That is, the left hydrogen cylinder may be also arranged on the left side off the center line RC and the right hydrogen cylinder may be also be arranged on the right side off the center line RC. In such a configuration, clearance between each hydrogen cylinder and the driving wheel can be also sufficiently secured.

The configuration in the above-mentioned embodiment is an example, it is natural that the configuration is not limited to application to a motorcycle, and it need scarcely be said that various modifications are allowed in a scope which does not deviate from the object of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel cell electric vehicle which is provided with a fuel cell for generating electric power by reacting hydrogen and oxygen, a hydrogen cylinder for supplying gaseous hydrogen to the fuel cell and a motor for generating motive power supplied to a driving wheel based upon electric power generated by the fuel cell and in which a longitudinal direction of the hydrogen cylinder is arranged above the driving wheel along a longitudinal direction of the vehicle, comprising:

a center line along the longitudinal direction of the hydrogen cylinder is located off a center line in a direction of the width of the driving wheel.

2. The fuel cell electric vehicle according to claim 1, wherein the driving wheel is attached to a rear frame supported by a body frame so that the rear frame can be rocked.

3. The fuel cell electric vehicle according to claim 1, wherein the hydrogen cylinder is located in a position in which the end is substantially just beside a position of a seat of the vehicle.

4. The fuel cell electric vehicle according to claim 2, wherein the hydrogen cylinder is located in a position in which the end is substantially just beside a position of a seat of the vehicle.

5. The fuel cell electric vehicle according to claim 1, wherein the hydrogen cylinder is substantially cylindrical and the end is tapered.

6. The fuel cell electric vehicle according to claim 2, wherein the hydrogen cylinder is substantially cylindrical and the end is tapered.

7. The fuel cell electric vehicle according to claim 3, wherein the hydrogen cylinder is substantially cylindrical and the end is tapered.

8. The fuel cell electric vehicle according to claim 1, and further including a body cover for covering the surface of the hydrogen cylinder.

9. The fuel cell electric vehicle according to claim 2, and further including a body cover for covering the surface of the hydrogen cylinder.

10. The fuel cell electric vehicle according to claim 3, and further including a body cover for covering the surface of the hydrogen cylinder.

11. The fuel cell electric vehicle according to claim 4, and further including a body cover for covering the surface of the hydrogen cylinder.

12. A hydrogen cylinder adapted to be used with a fuel cell electric vehicle having a fuel cell for generating electric power by reacting hydrogen and oxygen, with the hydrogen cylinder for supplying gaseous hydrogen to the fuel cell comprising:

a hydrogen cylinder having a longitudinal direction arranged above a driving wheel along a longitudinal direction of the vehicle; and a center line along the longitudinal direction of the hydrogen cylinder is located off a center line in a direction of the width of the driving wheel.

13. The hydrogen cylinder adapted to be used with a fuel cell electric vehicle according to claim 12, wherein the driving wheel is attached to a rear frame supported by a body frame so that the rear frame can be rocked.

14. The hydrogen cylinder adapted to be used with a fuel cell electric vehicle according to claim 12, wherein the hydrogen cylinder is located in a position in which the end is substantially just beside a position of a seat of the vehicle.

15. The hydrogen cylinder adapted to be used with a fuel cell electric vehicle according to claim 13, wherein the hydrogen cylinder is located in a position in which the end is substantially just beside a position of a seat of the vehicle.

16. The hydrogen cylinder adapted to be used with a fuel cell electric vehicle according to claim 12, wherein the hydrogen cylinder is substantially cylindrical and the end is tapered.

17. The hydrogen cylinder adapted to be used with a fuel cell electric vehicle according to claim 13, wherein the hydrogen cylinder is substantially cylindrical and the end is tapered.

18. The hydrogen cylinder adapted to be used with a fuel cell electric vehicle according to claim 14, wherein the hydrogen cylinder is substantially cylindrical and the end is tapered.

19. The hydrogen cylinder adapted to be used with a fuel cell electric vehicle according to claim 12, and further including a body cover for covering the surface of the hydrogen cylinder.

20. The hydrogen cylinder adapted to be used with a fuel cell electric vehicle according to claim 13, and further including a body cover for covering the surface of the hydrogen cylinder.

\* \* \* \* \*